United States Patent [19]

Sakurai et al.

[11] Patent Number: 4,795,954
[45] Date of Patent: Jan. 3, 1989

[54] RESOLVER CONTROLLING METHOD AND APPARATUS

[75] Inventors: Shigeru Sakurai, Iruma; Akiho Hasuo, Kawagoe; Kazuo Tanabe, Ibaragi, all of Japan

[73] Assignee: Kabushiki Kaisha Yaskawa Denki Seisakusho, Fukuoka, Japan

[21] Appl. No.: 944,070

[22] Filed: Dec. 22, 1986

[30] Foreign Application Priority Data

Jan. 23, 1986 [JP] Japan .................................. 61-12888

[51] Int. Cl.⁴ ............................................... G05B 1/06
[52] U.S. Cl. ..................................... 318/661; 318/605
[58] Field of Search ............... 318/600, 601, 604, 605, 318/608, 638, 652, 656, 661, 448; 340/347 SY, 870.34

[56] References Cited

U.S. PATENT DOCUMENTS

| 4,216,466 | 8/1980 | Chasson et al. | 318/605 X |
| 4,247,810 | 1/1981 | Hicks | 318/661 |
| 4,321,684 | 3/1982 | Sommeria | 318/661 X |
| 4,594,540 | 6/1986 | Currie et al. | 318/661 |

FOREIGN PATENT DOCUMENTS

| 0078144 | 5/1983 | European Pat. Off. | 318/652 |
| 0723639 | 3/1980 | U.S.S.R. | 340/347 SY |

Primary Examiner—Bentsu Ro
Attorney, Agent, or Firm—Beveridge, DeGrandi & Weilacher

[57] ABSTRACT

A method and apparatus for controlling a resolver of two-phase excitation and one-phase detection type wherein an erroneous component in the output of the resolver is eliminated by periodically reversing the rotational direction of a rotating magnetic field generated in the resolver.

8 Claims, 4 Drawing Sheets

RESOLVER CONTROLLING METHOD AND APPARATUS

BACKGROUND OF THE INVENTION

This invention relates to a method and an apparatus for controlling a resolver having two phase exciting windings and a single phase detecting winding.

A conventional controlling apparatus for a resolver having two phase exciting windings and a single phase detecting winding is shown in the block diagram in FIG. 1. In this apparatus, a ring counter 1 counts a predetermined number of clock pulses CK, and delivers an output signal to a sine wave (SIN) table 2, a cosine wave (COS) table 3, and to a phase difference counter 10. The sine and cosine wave tables are stored within a read only memory (ROM). Upon reception of the output signal, the sine wave table 2 and the cosine wave table 3 deliver a sine wave and a cosine wave to power amplifiers 6 and 7 through D/A converters 4 and 5, respectively. The outputs of the power amplifiers 6 and 7 are applied to the $\alpha$ phase and $\beta$ phase windings of a resolver 8 for exciting the same. According to the rotation of the resolver 8, a detecting phase winding of the resolver 8 delivers a signal representing a rotating angle $\theta$ of the resolver 8. A wave-shaping circuit 9 shapes the output signal of the resolver 8, and a phase-difference counter 10 counts the clock pulses CK for a period corresponding to the phase difference between the output of the ring counter 1 and the output of the wave-shaping circuit 9. The output of the phase-difference counter 10 is applied to a latch circuit 12 that holds the output for a predetermined time and then delivers the output to a CPU (central processing unit) 13. Upon reception of a command signal via an input-output (I/O) circuit 14, the CPU 13 delivers the output of the latch circuit 12 which represents the rotating angle $\theta$ as an output through an internal bus and the I/O circuit 14.

More specifically, when the $\alpha$ and $\beta$ phase windings of the resolver 8 are excited by voltages $e_1 \sin \omega t$ and $e_1 \cos \omega t$, respectively, an output voltage of $e_2 \sin (\omega t - \theta)$ is delivered through the detecting winding of the resolver 8. In the above expression, $e_1$ and $e_2$ represent amplitudes of the voltages, $\omega$ represents an angular frequency, t represents time, and $\theta$ represents a rotating angle of the resolver 8 measured with reference to the $\alpha$-phase magnetization axis.

Accordingly, by measuring the phase difference between the $\alpha$-phase exciting voltage $e_1 \sin \omega t$ and the detected voltage $e_2 \sin (\omega t - \theta)$, the rotating angle $\theta$ of the rotor of the resolver 8 can be determined.

In the arrangement shown in FIG. 1, clock pulses CK are counted by the ring counter 1, a sine wave and a cosine wave are obtained from the SIN/COS tables 2 and 3, and the two phase windings of the resolver 8 are excited by the sine wave and the cosine wave.

The phase-difference counter 10 counts the clock pulses CK from a specific time designated by the ring counter 1 (in this case, a rising edge of $\sin \omega t$) to another specific time according to the detected voltage (in this case, a rising edge of $\sin (\omega t - \theta)$), and delivers an output signal corresponding to $\theta$ to the CPU 13, which in turn provides output data related to the rotating angle $\theta$ of the resolver 8.

However, when the above described resolver control apparatus is actually used, a phase delay is caused by the lead wires 101 extending from the control circuit 100 to the resolver 8 shown FIG. 2, and also by the resolver itself. Such a phase delay results in a problem in the execution of the measurement. That is, since the phase-delay property tends to vary according to ambient temperature, obtaining an absolutely precise measurement of the rotating angle of the resolver is made difficult.

More specifically, a phase delay of $\phi$ ordinarily is attributed to the control circuit 100, starting from the output side of an instruction device (ring counter 1 in FIG. 1) and ending at the input side of a signal processor (phase-difference counter 10 in FIG. 1). Accordingly, the detected signal applied to the phase-difference counter 10 forming the signal processor is expressed as $$e_3 \sin (\omega t - \theta - \phi)$$
$$= e_3 \sin [\omega t - (\theta + \phi)]$$

wherein $e_3$ represents the amplitude of the detected signal.

The angle of phase delay $\phi$ varies with the length of the lead wires and exterior conditions such as ambient precise control thereof is extremely difficult.

As a consequence, the conventional technique for controlling a resolver has the following disadvantages.

(1) A phase delay is caused by the lead wires 101 extending between the control circuit 100 and the resolver 8. Also, the way and devices required for installing the lead wires impair the precision of the measurement.

(2) The resistance of the windings of the resolver 8 varies with the temperature changes and, thus the time constant and the phase delaying property of the same are varied.

(3) The phase-delaying property of the cable fitting devices also varies with temperature changes.

(4) The phase property of a filter (not shown), which is provided for removing higher harmonics from the control circuit 100 and from the detected voltage varies with temperature changes.

SUMMARY OF THE INVENTION

An object of the present invention is to provide a method and an apparatus for controlling a resolver, wherein the above described disadvantages in the conventional technique are overcome.

Another object of the invention is to provide a method and apparatus of simple implementation wherein compensation is made for the aforementioned phase delay.

These and other objects of the invention can be achieved by a method for controlling a resolver of a two-phase excitation and one-phase detection type wherein an erroneous component in the output of the resolver is eliminated by periodically reversing the rotational direction of a rotating magnetic field generated in the resolver.

According to another aspect of the invention, there is provided an apparatus for controlling a resolver of a two-phase excitation and one-phase detection type, which apparatus comprises means for generating a sine wave and a cosine wave simultaneously in a cyclic manner and applying these waves to two exciting windings of the resolver, respectively, to generate a rotating magnetic field in the resolver, means for periodically changing the polarity of either the sine or the cosine waves, to reverse the rotational direction of the rotating magnetic field, means for obtaining first and second outputs having different phase angles from the detecting winding of the resolver and for detecting phase angles of the first and second outputs, and means for calculating one half of the difference of the thus detected phase angles for determining a rotated angle of the resolver.

DESCRIPTION OF THE PREFERRED EMBODIMENTS

Preferred embodiments of the invention will be described with reference to FIGS. 3 to 8.

Figure 1:
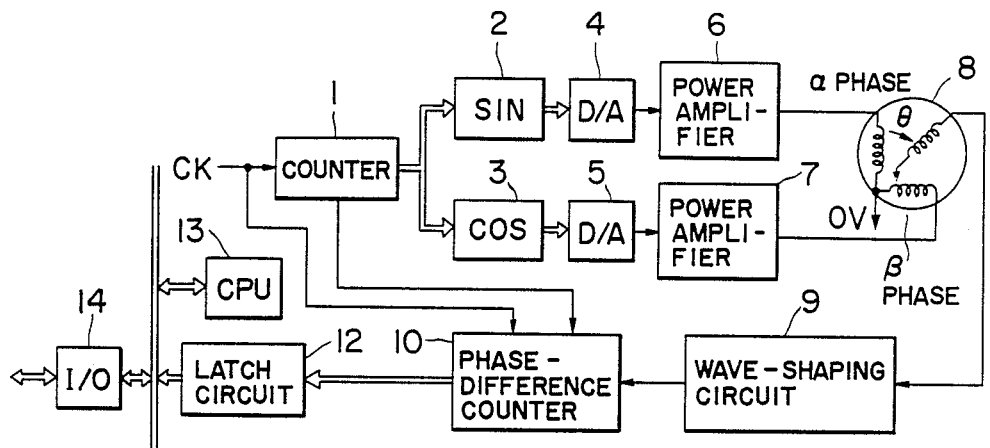
FIGS. 1 and 2 are block diagrams showing a conventional control apparatus for a resolver.
Figure 2:
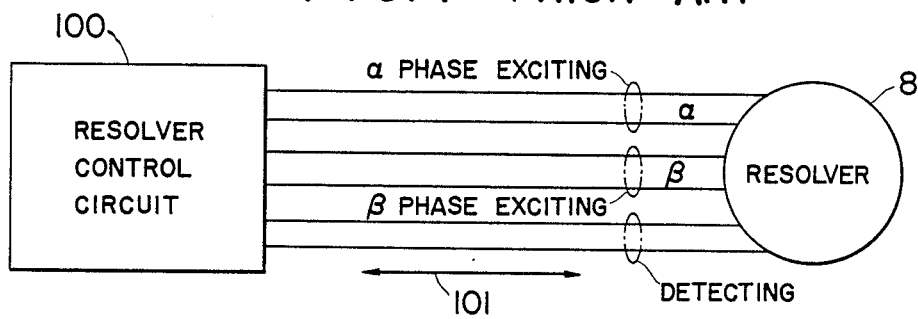
Figure 3:
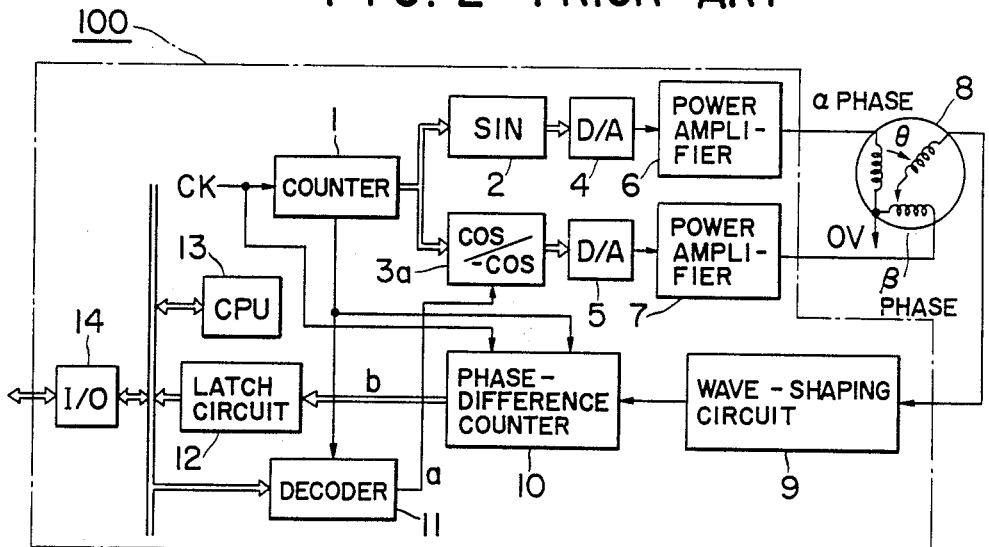
FIG. 3 is a block diagram showing a preferred embodiment of the present invention.

FIG. 3 illustrates a preferred embodiment of the present invention wherein elements similar to those in FIG. 1 are designated by similar reference numerals.

In this embodiment, a cosine wave generating table 3a, also in the form of a ROM, is provided instead of the cosine wave table 3 in FIG. 1, and a decoder 11 is further provided in this embodiment for delivering a signal a under the command of CPU 13. The cosine wave generating table 3a generates a (−cosine) signal each time the signal a is received from the decoder 11.

In the embodiment of FIG. 3, the α-phase exciting winding of the resolver is excited by a sine wave voltage, while β phase exciting winding thereof is excited by a cosine wave voltage, as in the case of the conventional apparatus shown in FIG. 1.

However, since the excitation of the β phase winding is periodically changed to (−cosine) as described above, the direction of rotation of the rotating magnetic field thereby produced is periodically reversed. The reversed direction of rotation of the rotating magnetic field results in two different phase angles in the output detected from the detecting winding of the resolver. By carrying out a calculation for obtaining ½ of the subtracted result of the two phase angles, a the erroneous valve introduced by the phase delay $\phi$ in the conventional apparatus can be eliminated.

More specifically, when α and β phase exciting windings of the resolver are excited by the application of two voltages $e_1 \sin \omega t$ and $e_1 \cos \omega t$, a voltage $e_3 \sin (\omega t - \theta - \phi)$ is detected. On the other hand, when the α and β phase exciting windings are excited by two voltages $e_1 \sin \omega t$ and $-e_1 \cos \omega t$, respectively, another voltage of $e_3 \sin (\omega t + \theta - \phi)$ is detected from the detecting winding.

The phase difference between $\sin \omega t$ and $\sin (\omega t - \theta - \phi)$ is $(\theta + \phi)$ and the phase difference between $\sin \omega t$ and $\sin (\omega t + \theta - \phi)$ is $(-\theta + \phi)$, so that by calculating ½ of the difference between $(\theta + \phi)$ and $(-\theta + \phi)$, the value of $\theta$ can be determined. Furthermore, the output signal a delivered from the decoder 11 initiates a transfer operation for the cos/−cos generating table 3a, while the output signal b delivered from the phase-difference counter 10 is latched by a latch circuit 12, so that the phase-difference data can be read out only after transient conditions are stabilized after 2 or 3 operational cycles.

In addition, the phase differences $(\theta + \phi)$ and $(-\theta + \phi)$ are transmitted from the phase-difference counter 10 to the CPU 13, in which a calculation of $$[(\theta+\phi)-(-\theta+\phi)]/2=\theta$$

is carried out in with software.

Figure 4:
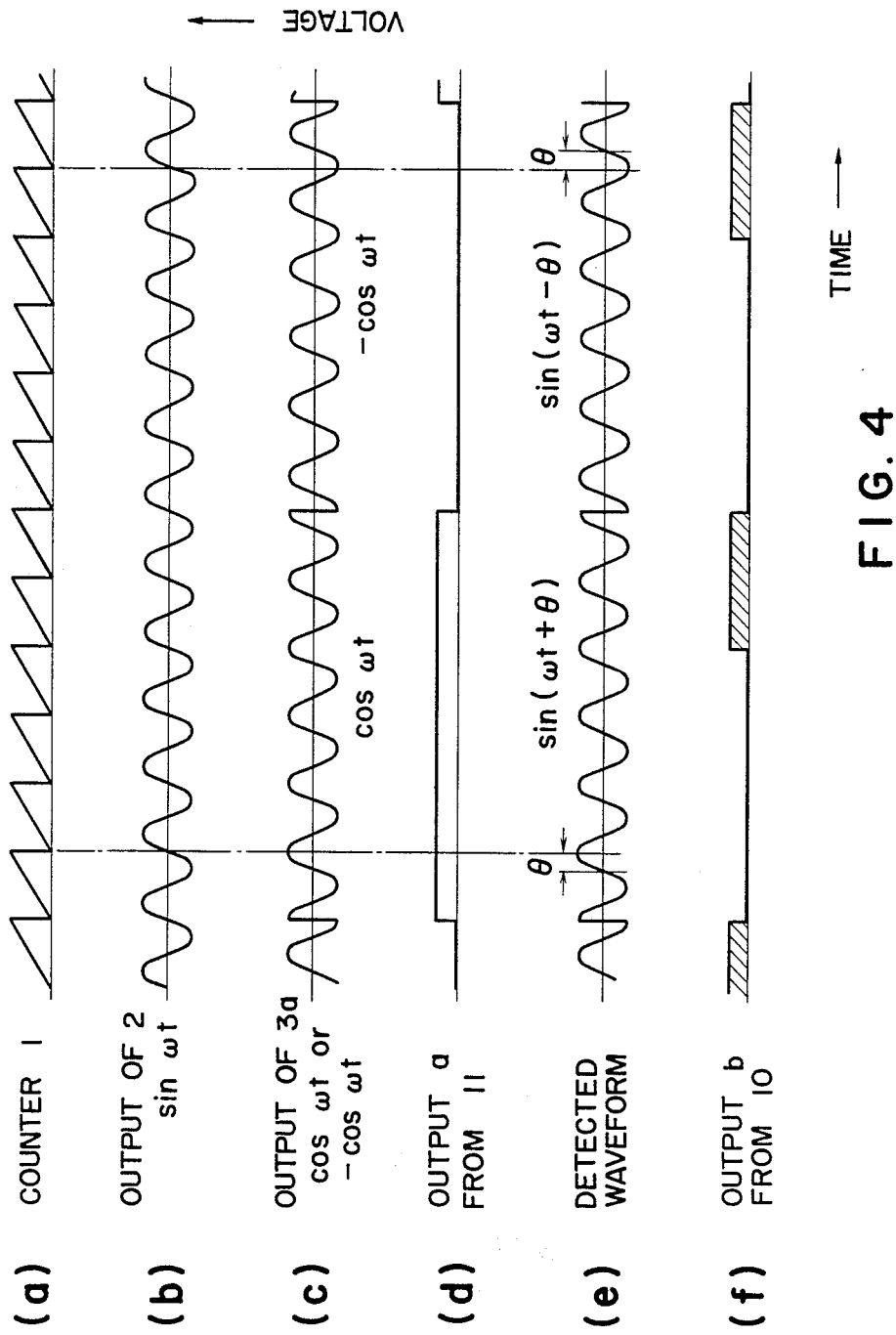
FIG. 4 is a timing diagram showing voltages appearing at various points in the embodiment shown in FIG. 3.

Waveforms showing time relations between various steps such as excitation, transfer of excitation, detection of the output and calculation are indicated in FIG. 4.

Figure 5A:
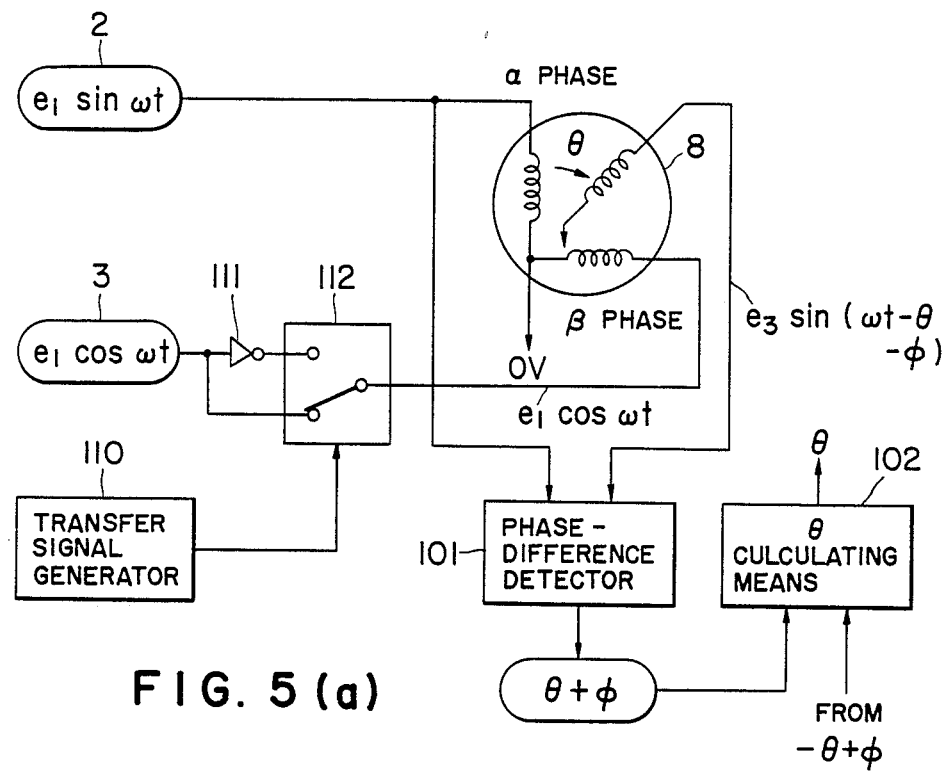
FIGS. 5(a) and 5(b) are diagrams useful for understanding a basic principle of the present invention.
Figure 5B:
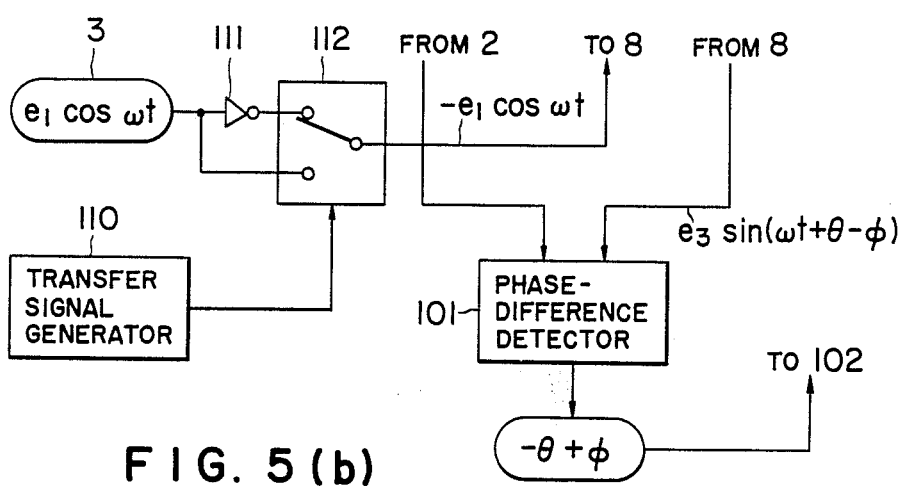

FIGS. 5(a) and 5(b) illustrate the principle of the present invention. A state wherein the polarity of the exciting voltage $e_1 \cos \omega t$ is not reversed, and a phase angle of $(\theta + \phi)$ is obtained for the output of the resolver 8 is illustrated in FIG. 5(a), while a state wherein the polarity of the exciting voltage is reversed to $-e_1 \cos \omega t$ and a phase angle of $(-\theta + \phi)$ is obtained for the output of the resolver 8 is illustrated in FIG. 5(b). The phase angles $(\theta + \phi)$ and $(-\theta + \phi)$ are then applied to a $\theta$ calculating means 102, in which the time delay $\phi$ is eliminated and the rotating angle $\theta$ of the resolver 8 is calculated. Numeral 110 designates a transfer signal generator, numeral 111 designates an inverting element, 112 designates a transfer means, 101 a phase-difference detector, and numeral 102 designates a $\theta$ calculating means.

Figure 6:
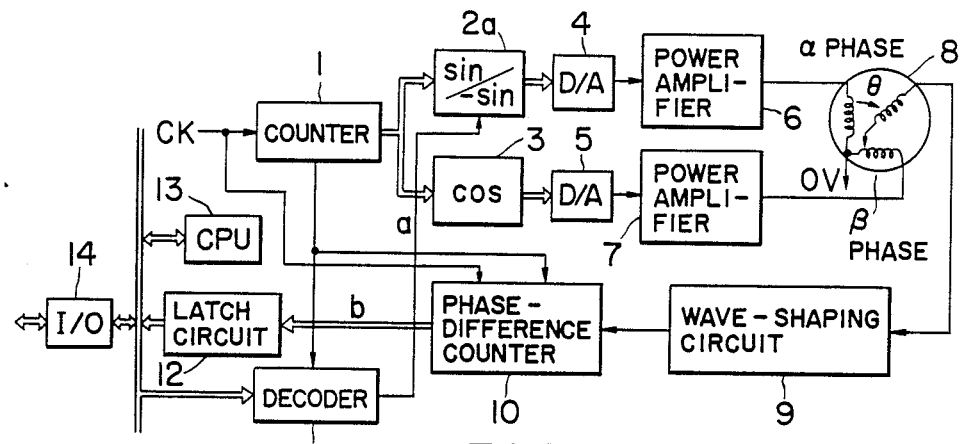
FIGS. 6, 7 and 8 are block diagrams showing further embodiments of the present invention.

FIG. 6 illustrates another embodiment of the present invention, wherein a sine wave generating table 2a, also in the form of a ROM, and controlled by a signal a from the decoder 11 so as to generate a −sine wave is provided instead of the sine wave generating table 2 provided in the embodiment shown in FIG. 3. The operation of this embodiment is quite similar to that of FIG. 3.

Figure 7:
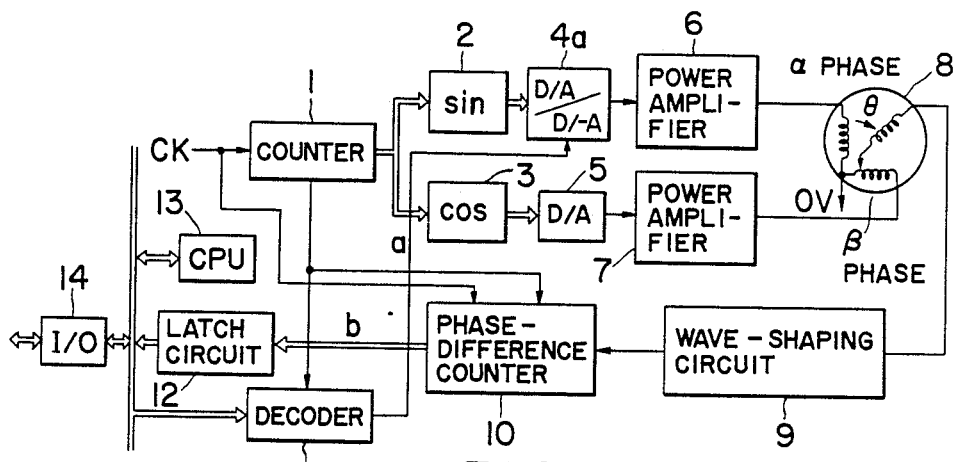
Figure 8:
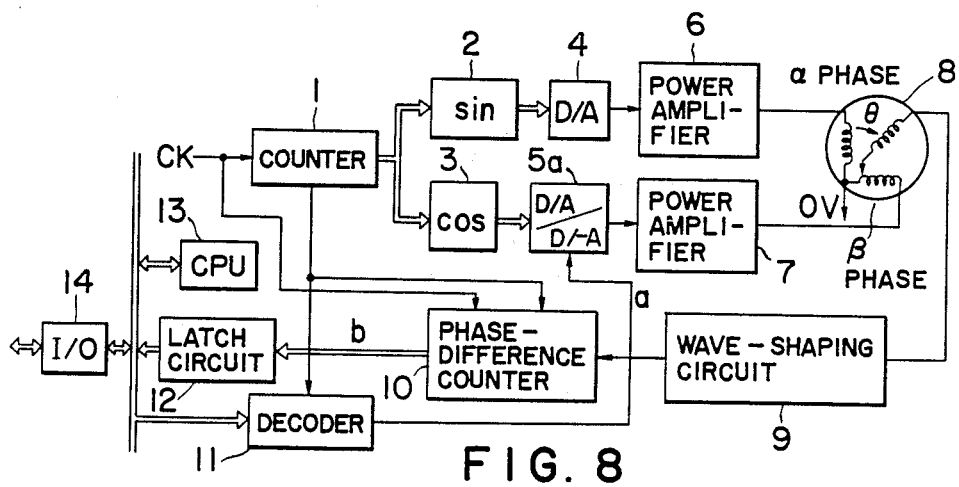

The apparatus of this invention also may be implemented as shown in FIGS. 7 and 8, wherein instead of the D/A converters 4 and 5 shown in FIG. 3, D/A/D-/−A converters 4a and 5a are provided, resectively. Either of these converters 4a and 5a is constructed such that when a transfer signal a is applied from the decoder 11, the converter 4a or 5a delivers an analog signal of a reversed polarity to, thereby reverse the polarity of excitation of the corresponding excitation winding.

According to the present invention compensation is made for, any variation of the operational charcteristics of the control circuit, inclusive of the wirings and the resolver itself, due to a temperature variation, and a phase delaying component is eliminated from the output of the resolver. A control system capable of controlling a resolver at a high precision is realized according to the present invention can contribute much in the development of the related field of industry.

What is claimed is:

1. A method for controlling a two-phase excitation and one-phase detection type resolver to eliminate an erroneous component in the output of the resolver, said method comprising the steps of:
    causing the resolver to generate a rotating magnetic field; and
    periodically reversing the direction of rotation of the rotating magnetic field.

2. The method according to claim 1 wherein the reversing of the direction of rotation of the rotating magnetic field comprises changing the excitation direction at a time determined by the exciting voltage or current.

3. The method according to claim 1 further comprising allowing transient conditions to stabilize following reversal of the rotational direction of the rotating magnetic field, and subsequently providing as an output signal data related to the resolver rotational angle direction of the rotating magnetic field.

4. The method according to claim 1 wherein the reversing of the direction of rotation of the rotating magnetic field comprises reversing the polarity of an exciting waveform for one of two excitation phases of the resolver.

5. The method according to claim 4 wherein the reversing of the polarity is carried out at a time determined by the exciting voltage or current.

6. The method according to claim 4 further comprising allowing transient conditions to stabilize following reversal of the polarity, and subsequently providing as an output signal data related to the resolver rotational angle.

7. A method for controlling a resolver having two exciting windings and one detecting winding, comprising the steps of:
   simultaneously generating a sine wave and a cosine wave in a cyclic manner,
   respectively exciting said two exciting windings by said sine wave and said cosine wave to generate a rotating magnetic field in the resolver,
   periodically changing the polarity of either the sine wave or the cosine wave to change the rotational direction of said rotating magnetic field of the resolver,
   obtaining first and second outputs having different phase angles from said detecting winding of the resolver,
   detecting phase angles of said first and second outputs, and
   calculating one half of the difference of the detected phase angles to determine the rotational angle of the resolver.

8. An apparatus for controlling a resolver having two exciting windings and one detecting winding, said apparatus comprising:
   means for generating a sine wave;
   means for applying said sine wave to one of said exciting windings;
   means for generating a cosine wave;
   means for applying said cosine wave to the other of said exciting windings, said sine and cosine waves causing generation of a rotating magnetic field in the resolver;
   means for periodically changing the polarity of either said sine wave or said cosine wave to thereby reverse the direction of rotation of said rotating magnetic field;
   means for obtaining first and second outputs having different phase angles from said detecting winding of the resolver and for detecting phase angles of said first and second outputs, and
   means for calculating one half of the difference of the detected phase angles and thereby determining a rotated angle of the resolver.

* * * * *